//patents.google.com/patent/US3009018

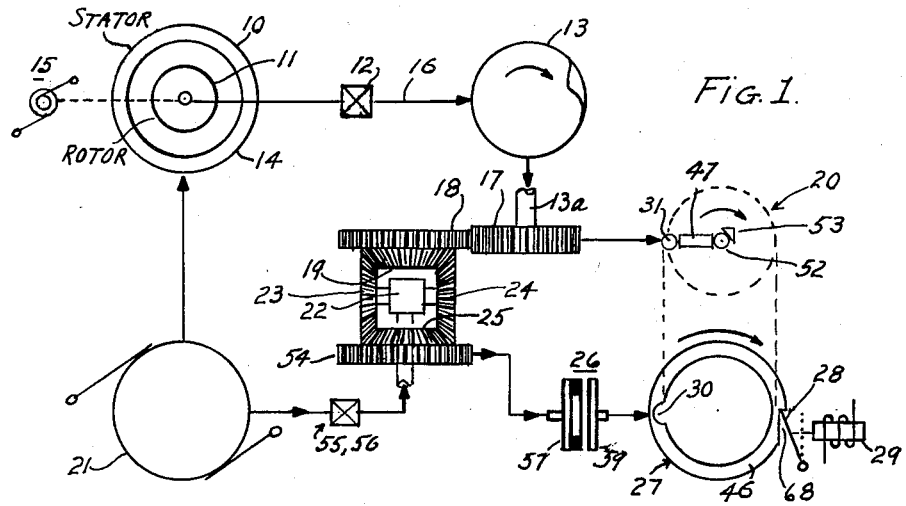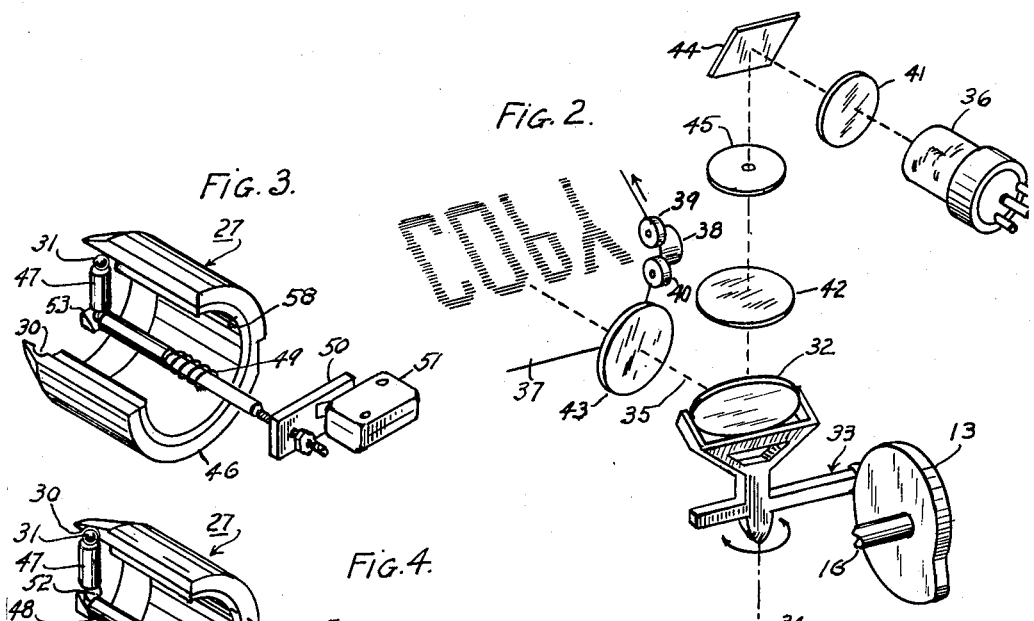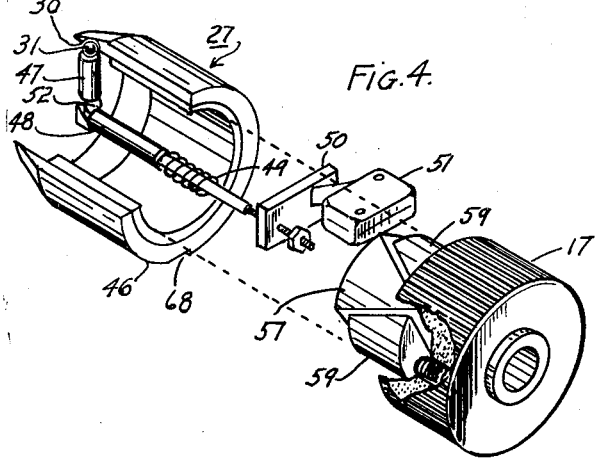
HARRY STRICKHOLM
EDWARD L. LINCOLN, JR.
INVENTORS.
BY John J. Rogan
ATTORNEY

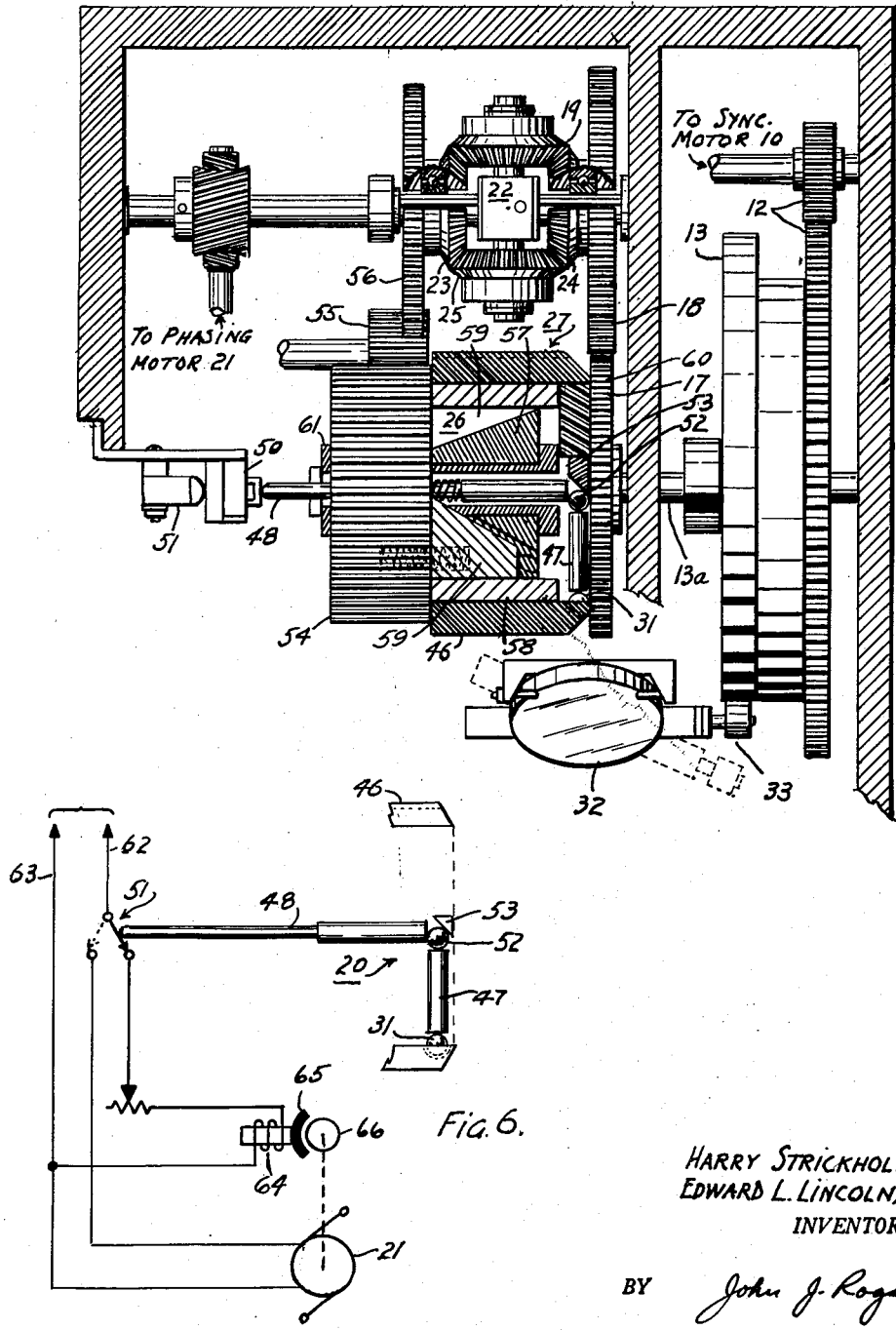

United States Patent Office 3,009,018
Patented Nov. 14, 1961

3,009,018
PHASING MECHANISMS FOR FACSIMILE MACHINES AND THE LIKE
Harry Strickholm, Great Neck, and Edward L. Lincoln, Jr., Brooklyn, N.Y., assignors, by mesne assignments, to Litton Systems, Inc., Beverly Hills, Calif., a corporation of Maryland
Filed Sept. 1, 1959, Ser. No. 837,488
10 Claims. (Cl. 178—69.5)

This invention relates to phasing mechanisms and more particularly to phasing of a recording device under control of a received phasing signal or pulse. The phasing pulse is employed to position a small light-weight rotary element which is called a "memory ring," to indicate phasing "error." A cooperating rotatable member, which is called a "coincidence detector device," cooperates with the memory ring, but is driven by the drive motor which drives the load which is to be phased. An auxiliary motor is provided to shift the angular position of the load or recording mechanism until the coincidence detector device reaches the desired position as indicated by the memory ring. At this point the auxiliary motor is stopped and the driving motor continues to drive the recording mechanism or load at a synchronous speed and in phase with the remote transmitter.

The invention is in the nature of an improvement on the kind of phasing controls disclosed in U.S. Patent No. 2,907,826, granted October 6, 1959. The main object of the invention is to provide an improved and more reliable phasing mechanism of that kind, and one which permits speed change gear between the synchronous motor and load and will not introduce any difficulties in obtaining the required uniform synchronous drive of the load or recording mechanism.

In accordance with the invention, the above noted object is attained by using a differential consisting of the usual end and spider gears and located in a particular relation to the driving and driven elements. However, the recording mechanism or load is driven directly or through gearing from the driving motor, and phasing adjustment is made by turning the stator of the driving motor. The end gears of the differential are connected to the load and to the memory ring respectively. The spider carrying the spider gears is connected to the shaft of the auxiliary or phasing motor. As the phasing motor turns the stator of the driving motor, thus adjusting the position of the load, it also produces a corresponding adjustment of the coincidence detector. Since the position of the memory ring initially recorded the phase error of the load or recording mechanism, when the coincidence detector is rotated by an amount equal to the error in the phase of the recording mechanism, the auxiliary motor is automatically stopped and the drive motor continues to drive the load or recording mechanism in the desired phase relation. By the use of a differential connected in the above described manner, it is possible to effect the simultaneous adjustment of the memory ring or coincidence detector and the load or recording mechanism without an interposed differential between the drive motor and the recording mechanism or load. It has been found that when using a differential gear system directly between the drive motor and load, because of gear irregularities, gear chatter and the like, corresponding irregularities are introduced in the driving power applied to the load and these irregularities appear in the reproduced copy.

Accordingly one of the novel features of the invention relates to the combination, interconnection and relative location of parts whereby more accurate phasing and synchronism of a rotatable load such as a facsimile scanning or recording element can be achieved.

Another feature relates to a novel construction of the means for automatically stopping an auxiliary or phasing motor when the desired phase coincidence between the rotatable elements is achieved.

Other features and advantages not specifically enumerated will be apparent after a consideration of the following detailed descriptions and the appended claims.

While the invention finds its primary utility in connection with the phasing and synchronous driving of a rotatable facsimile scanning element or control, the invention has utility in any kind of electro-optical transmitting and reproducing systems employing rotatable scanning control elements. Accordingly while the invention will be illustrated as applied to a facsimile recording mechanism of the optical scanning kind employing an oscillating mirror driven by a rotary cam to constitute the load which is to be phased and synchronously driven, it will be understood that any other well known kind of facsimile mechanism may constitute the load to be phased and synchronously driven.

In the drawings, FIG. 1 is a view, partially diagrammatic, of phasing mechanism embodying the invention;

FIG. 2 shows a typical recording system including a rotary cam which represents the load schematically shown in FIG. 1, said cam being employed to oscillate a mirror in an oscillatory scanning system;

FIGS. 3 and 4 are fragmentary perspective views of the memory ring and coincidence detector device shown schematically in FIG. 1;

FIG. 5 is a side elevation of the mechanical element assembly of the phasing system shown in FIG. 1, the drive and auxiliary motors being omitted for the sake of clarity;

FIG. 6 is a schematic circuit diagram of the auxiliary motor control.

Referring to FIG. 1 of the drawings, a drive motor 10 has its rotor 11 coupled through reduction gearing 12 to a recording mechanism or load 13, which may for example be a cam 13 as shown in FIG. 2. In a facsimile recorder wherein the cam 13 is to be operated at precisely synchronous speed, the motor 10 is ordinarily a synchronous motor which is supplied with a constant frequency, as for example from a frequency standard (not shown). The motor 10 is of the kind having an adjustably mounted stator 14 whose rotary angular orientation around the motor rotor can be adjusted for phasing purposes without changing the synchronous motor speed. Since the stator 14 of the motor 10 is rotatably mounted to adjust the phase relation of the system, the current for driving the motor is connected through the slip rings 15 as indicated diagrammatically. The driven shaft 16 to which cam 13 is fastened is also connected directly or through gearing 17, 18 to one of the end gears 19 of a differential mechanism, and also to the rotatable coincidence detector device 20. An auxiliary or phasing motor 21 has its drive shaft connected to the stator 14 of the motor 10 to turn this stator around its axis, and also to turn the spider 22 of the differential by an equal or proportionate amount. The spider 22 carries spider gears 23 and 24 which mesh with the end gears 19 and 25 of the differential. Thus, it will be seen that when the spider 22 is stationary, the end gears 19 and 25 of the differential, rotate at the same speed but in opposite directions. The end gear 25 is coupled through a slip-friction clutch 26 to a rotatable memory ring 27. The coincidence device 20 and the memory ring 27 cooperate and are normally rotated in the same direction at the same speed by the shaft 16 through the intermediary of clutch 26. However, the memory ring may be stopped and phased by the armature 28 of the phasing magnet 29 to record, by its stopped orientation, the time or location of the phasing pulse as well known in the art.

The memory ring 27 is notched at the point 30 to receive a ball or similar element 31 of the coincidence detector device, thus registering the "coincidence" in positional orientation of the device 20 and memory ring 27, when the recording mechanism is in phase, for example with a distant or associated transmitter (not shown) as will be explained in more detail in connection with FIGS. 3, 4 and 5. The purpose of the clutch 26 is merely to permit the memory ring 27 to be stopped and then released for rotation at synchronous speed by the phasing magnet 29 upon the receipt of the phasing pulse.

As shown in FIG. 2 by way of example, the cam 13 representing the load to be phased may be employed to actuate an oscillating mirror 32 mounted on a cam follower 33 arranged to pivot around the axis 34, and arranged to swing the light beam 35 from a recorder lamp 36 back and forth across the sensitized recording medium or photographic film 37 in the usual manner. The film 37 may be held in contact with a rotary backing member 38 and moved in the direction of the arrow by sets of suitable feed rollers 39, 40 at opposite edges of the film. The optical system shown in FIG. 2 embodies the usual collimating and condensing lenses 41, 42, 43, mirror 44 and an aperture plate 45. In a recording mechanism of this kind, the heavy operating cam 13 presents a problem in phasing on a single phasing impulse as compared with the phasing of a light-weight memory ring. It will be understood that any other well known type of recording mechanism may be substituted for that shown, the invention residing primarily in the synchronous driving and phasing mechanism.

In the preferred form of phasing mechanism illustrated in FIGS. 3 to 5, the memory ring 27 consists of a cylindrical sleeve 46 provided at one end with the notch 30, the said sleeve surrounding the coincidence detector device 20. This device includes the ball 31, radial rod 47 and longitudinal push rod 48, which move when the ball 31 drops into the notch 30. The radial and longitudinal push rods are urged outwards by a compression spring 49 surrounding the longitudinal push rod 48 which is concentric within sleeve 46. Rod 48 is connected to the operating arm 50 of a control mechanism represented by a microswitch 51. The two positions of the coincidence detector device, which represent respectively the closed and open positions of the micro-switch 51, are shown in FIGS. 3 and 4 respectively. As shown more clearly in FIG. 5, the inner end of the radial push rod 47 engages a ball 52 which engages in turn a wedge-shaped cam 53, and the inner end of the longitudinal push rod 48. Thus, when the radial push rod moves in either direction of its length, a corresponding longitudinal movement of the longitudinal rod 48 occurs, thereby operating the micro-switch 51. The memory ring 27 is rotated by gear 54 which is driven by the auxiliary or phasing motor 21 through gears 55, 56. As shown in FIG. 5, the coincidence detector device comprising the elements 31, 47, 52, 53 (see FIG. 1) is rotated at synchronous speed since it is mounted on the shaft 13a of the cam 13, said shaft being rotated by spur gears 12 driven by the motor 10.

The sleeve 46 of the memory ring 27 has on its interior a tapered clutch member 57 which frictionally engages the oilite clutch face 58 to form part of the clip-friction clutch 26 (see FIG. 1). The other part of that clutch includes a cooperating set of tapered clutch members 59 which are carried by gear 54. Gear 54 is mounted concentric to shaft 13. Hollow shaft 61 is an extension of shaft 13a. The rod 48 is slidably telescoped within the said hollow shaft, and the hub 60 of gear 17 has a radial channel in which are located the radial rod 47, the ball 52 and the wedge cam 53 of the coincidence detector 20. It is clear, therefore, that the coincidence detector 20 is rotated at synchronous speed since it is mechanically connected to the cam shaft 13a.

The slip-friction clutch constituted of members 57, 58 and 59, is interposed between the gear 54 and the cylindrical sleeve 46 of the memory ring unit 27. This permits the memory ring to be stopped by the shiftable stop member 28 (see FIG. 1) until the receipt of a phasing pulse which is applied to magnet 29. It should be observed that prior to phasing, when the synchronous motor 10 is rotating, the magnet 29 is normally energized by a suitable switch (not shown) allowing the memory ring 46 to rotate at synchronous speed. Referring to FIGS. 1 and 3, when the phasing operation is to be effected, the magnet 29 is deenergized, thus stopping the ring 46 and fixing the angular orientation of the notch 30 with respect to the time of arrival of the phasing pulse.

It should be observed that when the members 20 and 27 are in proper phase relation, the ball 31 is in the detent recess 30. On the other hand, when the ring 46 is stopped by member 28, the coincidence detector 20 continues to rotate and the detent 30 acts as a cam to force the radial arm 47 downwardly, as seen in FIGS. 3 and 5, thus moving arm 48 against the force of spring 49 and operating the microswitch 51 to the dotted line position as schematically shown in FIG. 6. This closes the power circuit for the phasing motor 21 which thereupon starts to turn the stator 14 of the synchronous motor 10. At the same time the phasing motor also turns the spider 23 of the differential.

When the phasing impulse is received to cause the energization of magnet 29, the phasing error between the position of detent 30 and cam 13 is commensurate with the angular displacement of radial rod 47 and detent 30. If there is a phasing error, the phasing motor 21 is started in operation as above described, and preferably it moves the stator 14 so that for a short interval the rotational speed of cam 13 is above its prescribed synchronous speed. Since the differential spider 22 is also being rotated in unison with the stator 14, the memory ring 27 is maintained at synchronous speed even though the cam 13 is instantaneously above synchronous speed. When the device 20 catches up so that the ball 31 falls into the detent 30, the arm 48, under the force of spring 49, is moved to the left as shown in FIG. 4, thus moving the microswitch to its full line position as shown in FIG. 6. In that position the power from the supply conductors 62, 63 is applied to the winding 64 of an electromagnetically controlled friction brake 65 on shaft 66 of the phasing motor, thereby stopping that motor and any further relative change in the phase of members 20 and 27. Therefore the cam 13 and its associated load elements continue to rotate in the proper phase relation at the synchronous speed of motor 10.

From the foregoing it will be seen that the phasing is accomplished by using a light-weight memory ring 46 which stores the phasing error, after which a necessary correction is made by rotating the stator 14 of the synchronous driving motor 10 which is directly coupled to the load. The direct coupling between motor 10 and the load device or cam 13 insures uniform rotation of that device at synchronous speed. Since no differential connections are provided between synchronous driving motor and the cam 13, any irregularities which would ordinarily result from such differential mechanisms do not affect the desired uniform rotation of the cam 13 and its associated load elements. On the other hand, by locating the differential gear between the load device or cam 13 and the memory ring 46 and coincidence detector 20, the ring 46 can be driven at synchronous speed at all times and the coincidence detector can be driven slightly above synchronous speed to achieve the necessary phase correction.

Various changes and modifications may be made in the disclosed embodiment without departing from the spirit and scope of the invention.

What is claimed is:

1. In a facsimile machine, the combination of a load member to be operated at synchronous speed and in controlled phase relation with another device, a drive motor having a rotor connected to said load member and a stator which is adjustably mounted independently of the rotor to control the phase of said load member during rotation thereof, two phasing control members driven from said drive motor, means to control the rotation of one member at a selected phase determined by the receipt of a phasing pulse from said device, means to cause the other phasing control member to be continuously rotated in phase synchronism with said load device, an auxiliary motor for adjusting said stator, and means including a differential gear train connecting the shaft of the auxiliary motor to both of said phasing control members to enable the first phasing control member to be continuously rotated by said drive motor at synchronous speed and at selected phase while allowing the other phasing control member to be rotated momentarily at a non-synchronous speed until its phase is identical with said selected phase, a circuit for supplying power to said auxiliary motor, and means controlled by said phasing member upon the arrival of said second phasing control member at said selected phase to open said circuit to stop further rotation of said auxiliary motor and also to stop further adjustment of said stator.

2. The combination according to claim 1 in which saiw differential gear train has a pair of end gears and a planetary gear, said load member having its shaft connected to one of the end gears and to the second one of said phasing control members, the first of said phasing control members being connected through a slip-friction clutch to the other end gear, and means connecting the shaft of the auxiliary motor to said planetary gear.

3. The combination according to claim 2 in which the first phasing control member is provided with an electromagnetically controlled stop element for releasing said first phasing control member for rotation through the intermediary of said clutch and in response to said phasing pulse from said other device.

4. The combination according to claim 2 in which the first phasing control member has a detent located at a predetermined place thereon as a phase reference point, and said second phasing control member has a shiftable element which registers with said detent only when both said phasing control members are in like phase, a switch for said auxiliary motor, and means for operating said switch under control of said shiftable element.

5. The combination according to claim 4 in which the first phasing control member is in the form of a lightweight ring having a detent, and the second phasing control member comprises a shaft concentric with said ring and carrying the radially shiftable arm, and an axially shiftable arm and means to shift said axial arm when the said radial arm is in registry with said detent.

6. The combination according to claim 1 in which said load device and said second phasing control member are in substantially direct drive connection with said drive motor, and said first phasing control member is in driven relation with said drive motor through said differential.

7. In a facsimile machine, the combination of a load member to be operated at synchronous speed and in selected phase relation with another device, a drive motor coupled to said load member, said drive motor having an angularly adjustable field for controlling phase adjustment of said load member during rotation thereof, an auxiliary motor for controlling the adjustment of said field, a rotatable phase-memory element, means to control said memory element in response to a phasing pulse from said other device to fix the phase of said load member, said memory element being driven by said drive motor at a maintained synchronous speed, a phase coincidence detector for detecting phase coincidence of said load and said other device, means including a differential gear train having end gears and a spider carrying planetary gears for maintaining said synchronous speed of said memory element, means connecting said auxiliary motor to said differential gear train to adjust said spider as said field is being adjusted whereby said memory element is maintained at said synchronous speed while said coincidence detector can be momentarily driven at a different speed until said memory element and said load member are in like phase, and circuit means responsive to said like phase for stopping further operation of said auxiliary motor.

8. In a facsimile receiver, the combination of a load member to be operated at synchronous speed and in desired phase relation, a drive motor coupled to said load member, said drive motor having an adjustably mounted stator to effect angular or phase adjustment of said load member during rotation, and phasing means including an auxiliary motor having a drive shaft, a differential comprising end and stator gears, a spider for rotatably supporting said spider gears, a rotatable coincidence detector device, means for coupling said coincidence device and one of said end gears to said load member, a rotatable memory ring cooperating with said coincidence device, means for coupling said memory ring to the other of said end gears to rotate said ring at synchronous speed, means for stopping the rotation of said memory ring and for releasing it for rotation upon the receipt of a phasing pulse, means for coupling the drive shaft of said auxiliary motor to the adjustable stator of said drive motor and also to said spider to vary the speeds of said load member and said memory ring until the load member is in the desired phase position, and means controlled by said coincidence detector device to open the circuit of said auxiliary motor.

9. In a facsimile receiver, the combination of a load member to be operated at synchronous speed and in desired phase relation, a drive motor coupled to said load member, said drive motor having an adjustably mounted stator to effect angular or phase adjustment of said load member during rotation, and phasing means including an auxiliary motor having a drive shaft coupled to said adjustable stator of the drive motor, a rotatable coincidence detector device coupled to said load member and drive motor, a rotatable memory element cooperating with said coincidence detector device, means for stopping the rotation of said memory element and for releasing it for rotation upon the receipt of a phasing pulse whereby its angular position with reference to said coincidence detector device determines the phasing error of said load member, and means including said drive motor and said auxiliary motor for rotating said memory element at synchronous speed during the phase adjustment of said load member, and means including said memory element and said coincidence detector for energizing said auxiliary motor to effect phase adjustment of said load member so long as the out-of-phase condition exists as indicated by the relation between said memory element and said coincidence detector.

10. In a facsimile receiver, the combination of a load member to be operated at synchronous speed and in desired phase relation, a drive motor coupled to said load member, said drive motor having an adjustably mounted stator to effect angular or phase adjustment of said load member during rotation, and phasing means including an auxiliary motor having a drive shaft coupled to said adjustable stator of the drive motor, a rotatable coincidence detector device coupled to said load member, said device including a rotatable feeler, a rotatable memory ring having a notch engageable with said feeler in one position corresponding to the desired phase relation of said load member, means for rotating and phasing the memory ring, and means including said auxiliary motor and said memory ring for adjusting the phasing of said load member until the feeler on said coincidence detector device engages the notch in the memory ring.

References Cited in the file of this patent

UNITED STATES PATENTS

| | | |
|---|---|---|
| 2,397,819 | Tear | Apr. 2, 1946 |
| 2,530,516 | Finch | Nov. 21, 1950 |